United States Patent
Kumar

[11] Patent Number: 5,646,510
[45] Date of Patent: Jul. 8, 1997

[54] AC LOCOMOTIVE OPERATION WITH DC BUS CURRENT SENSOR FAILURE

[75] Inventor: Ajith Kuttannair Kumar, Erie, Pa.

[73] Assignee: General Electric Company, Schenectady, N.Y.

[21] Appl. No.: 414,899

[22] Filed: Mar. 31, 1995

[51] Int. Cl.⁶ .................................................. H02P 9/04
[52] U.S. Cl. ........................ 322/16; 322/14; 290/40 B; 290/40 C
[58] Field of Search ................................. 322/7, 14, 15, 322/16, 25, 36, 37, 38, 39, 99; 290/3, 40 B, 40 R

[56] References Cited

U.S. PATENT DOCUMENTS

| | | | |
|---|---|---|---|
| 3,621,370 | 11/1971 | Vandervolt | 322/23 |
| 3,701,556 | 10/1972 | Richmond | 290/40 B |
| 4,461,958 | 7/1984 | Krohling et al. | 290/45 |
| 4,634,887 | 1/1987 | Balch et al. | 290/3 |
| 4,719,361 | 1/1988 | Brubaker | 290/45 |
| 4,853,553 | 8/1989 | Hosie | 290/40 |
| 5,051,682 | 9/1991 | Sekiguchi | 322/99 |
| 5,168,208 | 12/1992 | Schultz et al. | 322/25 |
| 5,168,416 | 12/1992 | Bailey et al. | 361/31 |
| 5,252,926 | 10/1993 | Menegoli | 324/545 |
| 5,298,842 | 3/1994 | Vanek et al. | 318/473 |
| 5,355,075 | 10/1994 | Wilson, III | 322/25 |
| 5,373,219 | 12/1994 | Grabowski et al. | 318/139 |
| 5,390,068 | 2/1995 | Schultz et al. | 361/95 |
| 5,432,413 | 7/1995 | Duke et al. | 318/139 |

*Primary Examiner*—Steven L. Stephan
*Assistant Examiner*—Nicholas Ponomarenko
*Attorney, Agent, or Firm*—Jill M. Breedlove; Marvin Snyder

[57] ABSTRACT

A control system for an AC diesel electric locomotive allowing for continued operation of the locomotive even in the instance of failure of current sensors providing current feedback information. The system is coupled to a plurality of DC to AC inverters with each of the inverters being connected for supplying controlled AC power to at least one AC electric traction motor coupled in driving relationship to wheels of the locomotive. The control system controls the power output of the inverters in response to an operator's command and to sensed operating conditions of the locomotive. One of the sensed operating conditions is power output of the converter determined by measuring its voltage and current output, the latter measurement using a series connected current monitor. The system incorporates apparatus for sensing failure of the current monitor and, in response thereto for modifying the control system to substitute a selected value for the sensed power output of the converter.

2 Claims, 3 Drawing Sheets

AC LOCOMOTIVE OPERATION WITH DC BUS CURRENT SENSOR FAILURE

BACKGROUND OF THE INVENTION

This invention relates generally to electrical propulsion systems for diesel electric locomotives equipped with alternating current traction motors and, more particularly, to a method and apparatus for enabling continued operation of the locomotive in the event of a failure of a current sensor.

In a conventional diesel electric locomotive, a thermal prime mover (typically a 16 cylinder turbo-charged diesel engine) is used to drive an electrical transmission comprising a synchronous generator that supplies electric current to a plurality of alternating current (AC) traction motors whose rotors are drivingly coupled through speed reducing gearing to the respective axle wheel sets of the locomotive. The generator typically comprises a main three-phase traction alternator, the rotor of which is mechanically coupled to the output shaft of the diesel engine. When excitation current is supplied to field windings on the rotating rotor, alternating voltages are generated in three-phase armature windings on the stator of the alternator. These voltages are rectified to produce a controlled amplitude DC voltage and then applied to one or more inverters which control the effective frequency of alternating current to be supplied to the field windings of the AC traction motors. The effective AC excitation frequency produced by the inverters controls the speed of the AC motors with power being controlled by pulse width modulation of the AC waveform.

In normal motoring operation, the propulsion system of the diesel electric locomotive is so controlled as to establish a balanced steady state condition wherein the engine driven alternator produces, for each discrete position of a throttle handle, a substantially constant optimum amount of electrical power for the traction motors. In practice, suitable means are provided for overriding normal operations of the propulsion controls and reducing engine load in response to certain abnormal conditions, such as loss of wheel adhesion or a load exceeding the power capability of the engine at whatever engine speed the throttle is commanding. This response, generally referred to as deration, reduces traction power, thereby helping the locomotive recover from such temporary conditions and/or preventing serious damage to the engine.

In addition, the propulsion control system conventionally includes means for limiting or reducing alternator output voltage as necessary to keep the magnitude of this voltage and the magnitude of load current from respectively exceeding predetermined safe maximum levels or limits. Typically, both the output voltage of the rectifier connected to the output of the alternator and the output current from the rectifier are monitored with appropriate sensors which provide both a feedback control of the propulsion system operation and also serve to prevent over-voltage and/or over-current conditions. At low locomotive speeds, the traction motor armatures are rotating slowly so that their back EMF is low. A low alternator voltage can now produce a maximum motor current which in turn produces the high tractive effort required for acceleration. On the other hand, the alternator voltage magnitude must be held constant and this magnitude level whenever locomotive speed is high since the traction motor armatures are rotating rapidly and have a high back EMF and the alternator voltage must be high to produce the required load current.

In conventional direct current (DC) traction motor powered locomotives, it is conventional practice to shut down the propulsion system upon detection of an abnormal current indication from the current sensor. Such practice is common since DC motors are susceptible to various high current conditions such as a flashover at the motor commutator or arcing between brushes on the commutator. Many different systems are disclosed in the prior art for automatically detecting and recovering from such flashover conditions. The significant feature of the DC motor is that it will recover from a flashover condition and thereby continue to be operable so long as the flashover condition is detected and extinguished prior to substantial damage being done to the commutator or brushes. In contrast, the more recently introduced AC traction motor powered locomotives do not have commutators which are subject to flashover conditions. In the event that an AC motor experiences a short circuit condition, that motor is irreparably damaged and cannot be brought back into service without stopping the locomotive and removing and overhauling the motor. Accordingly, it is common practice in an AC locomotive to shut down the locomotive when an abnormal current condition is detected. In many such systems, the abnormal current condition is caused by a failure of the current sensor rather than a failure of the AC electric motor. Accordingly, it is desirable to provide a propulsion system which includes means for detecting failure of the current sensor and for enabling continued operation of the locomotive in the event of a current sensor failure.

SUMMARY OF THE INVENTION

Among the several objects of the present invention may be noted the provision of a propulsion control system for a diesel electric locomotive utilizing AC traction motors in which the propulsion system includes apparatus for sensing a failure of the current monitoring means monitoring current produced by the onboard electric power generating means; the provision of an improved propulsion control system for an AC locomotive which allows the locomotive to continue to operate in the event of a failure of the current monitoring means; and the provision of a locomotive propulsion control system which can be automatically modified to inhibit use of the current monitor signal and to allow continued operation of the AC locomotive at reduced power.

In an illustrative form, the invention is implemented in a locomotive propulsion control system having voltage and current monitoring means for determining power output from an onboard power system. The power output of the power system is determined by multiplying the voltage output of the power system by its current output. The resultant product is proportional to power and is used to regulate the amount of power supplied to alternating current electric traction motors connected in driving relationship to wheel axle sets of the locomotive. More particularly, the measured output power of the power system is compared to a commanded power reference signal, which power reference signal is determined from an operator's command by position of a throttle. The difference between the measured power and the commanded power results in an error signal which is supplied to a proportional plus integral regulator and then summed with the commanded power signal to produce a power command for controlling the amount of power supplied to the electric traction motors. Conventionally, the power signal is divided by motor speed to yield a torque command so that the amount of power available to the electric traction motors is determined as a function of speed. At low speeds, the torque command allows higher currents to be applied to the motors to generate higher torque for starting the locomotive whereas at higher speeds, the amount of power can be reduced to maintain the available torque at a lower level needed for constant speed operation.

In the event of a failure of the current monitor, the measured power signal becomes erroneous, and the system responds by interrupting the error signal generated from the proportional plus integral regulator and substituting for the error signal a signal proportional to the magnitude of the commanded power signal. The substituted signal is inverted so that it becomes a negative value and is subtracted from the commanded power signal to thereby reduce the magnitude of the commanded power signal by a selected value. The resultant signal becomes the power signal that is then converted to torque by dividing by speed. The resultant torque command signal applied to control the propulsion system is therefore always a selected amount less than the actual commanded power set by the locomotive throttle. While such a method effectively derates the available power from the locomotive, it allows the locomotive to continue to operate at a reduced power and thus contribute to pulling of a load.

In one form, the current sensor output is continuously monitored and compared to selected control functions to determine if the current sensor is properly operating. For example, the output current indicated by the current monitor is continuously monitored to determine if the current is less than a preselected negative value or greater than a preselected high positive value. These values are selected to be outside the normal operating range of the locomotive so that such an indication by the current monitor would be an indication of a current monitor failure. The propulsion control system also monitors the output of the current monitor and compares it to estimated motor currents determined from information relating to throttle position and locomotive speed. In the event that the current indicated by the current sensor deviates from the estimated motor current by more than a preselected amount for at least several seconds, the system indicates a current monitor failure. In still another form, if the locomotive speed is greater than a preselected value, such as, for example, two miles per hour and the tractive effort generated is greater than a preselected value while the monitor is indicating essentially zero current, the system will also indicate a current monitor failure. A similar type of check to this last check occurs if the measured air gap horsepower is greater than a preselected value and the current sensor indicates essentially zero current.

BRIEF DESCRIPTION OF THE DRAWING

For a better understanding of the present invention, reference may be had to the following detailed description taken in conjunction with the accompanying drawings in which.

DETAILED DESCRIPTION OF THE INVENTION

Figure 1:
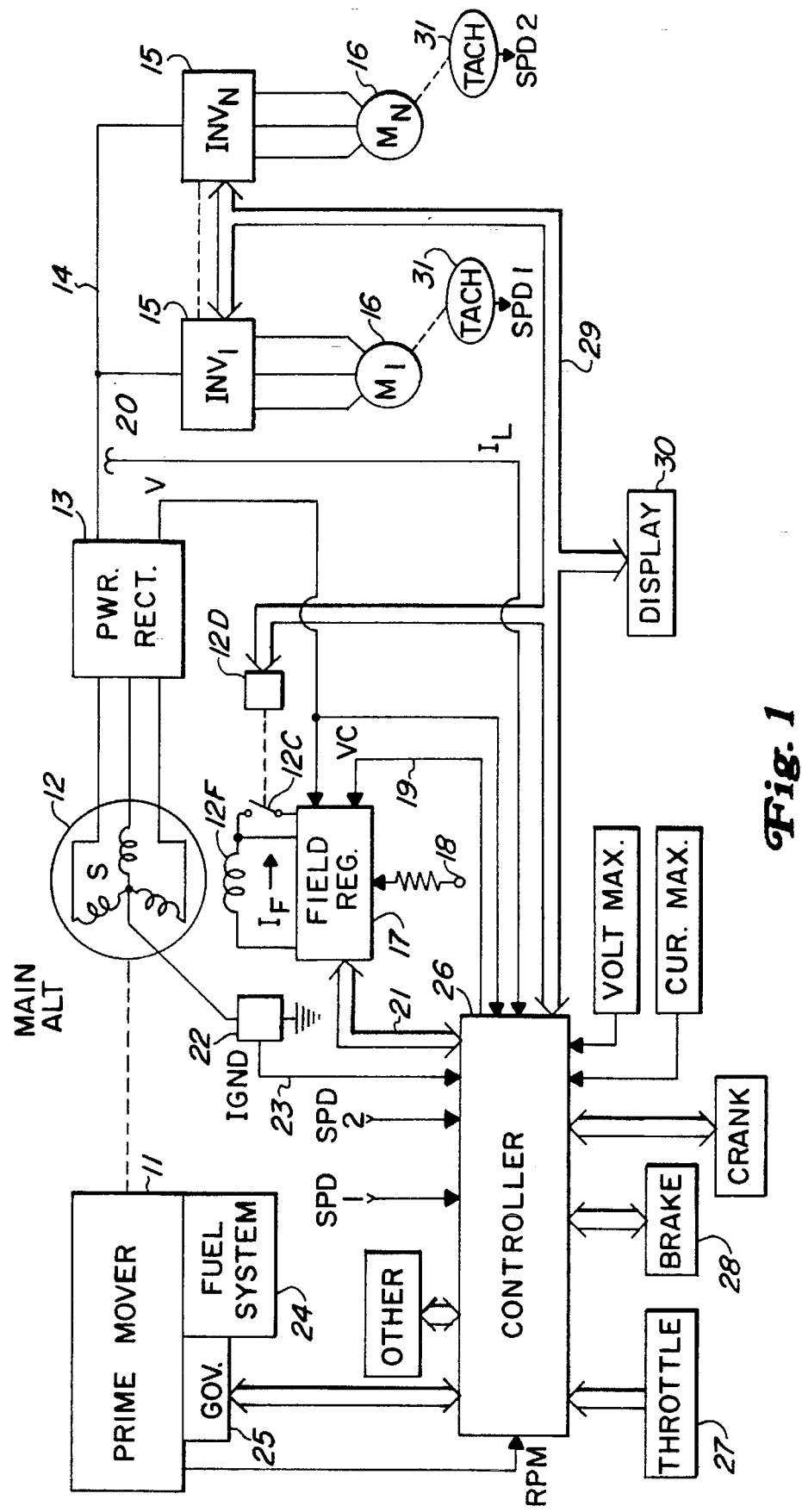
FIG. 1 is a simplified block diagram of an electrical propulsion system for a diesel electric locomotive.

The propulsion system shown in FIG. 1 includes variable speed prime mover 11 mechanically coupled to the rotor of a dynamoelectric machine 12 comprising a three-phase alternating current (AC) synchronous generator, also referred to as a main traction alternator. The main alternator 12 has a set of three star connected armature windings on its stator. In operation, it generates three-phase voltages in these windings, which voltages are applied to AC input terminals of at least one three-phase double-way uncontrolled power rectifier bridge 13. In a conventional manner, the bridge 13 is formed by a plurality of pairs of power diodes, each such pair of dimes being associated with each of the three different phases of the main alternator 12. The diodes in each pair are serially connected between relatively positive and negative direct current (DC) output terminals of the rectifier bridge, and their junction is connected by a protective fuse (not shown) to the respectively associated AC input terminal of the bridge. The output of the bridge 13 is electrically coupled, via DC bus 14, in energizing relationship to a plurality of parallel connected, electrically controllable inverters 15, only two of which are shown in the illustrated embodiment. The inverters 15 are conventional three-phase inverters having a plurality of pairs of controllable rectifiers connected in such a manner that by controlling the time at which each of the rectifiers is gated into conduction allows one to control the output frequency and power supplied by the inverters. The three-phase outputs of the inverters are connected to corresponding ones of the adjustable speed AC traction motors 16.

Prime mover 11, alternator 12 and rectifier 13 are suitably mounted on the platform of a self-propelled 4-axle or 6-axle diesel electric locomotive. A locomotive platform is in turn supported on two trucks (not shown), each having two or more axle wheel sets. A separate one of the traction motors 16 is hung on each axle and its rotor is mechanically coupled via conventional gearing and driving relationship to the associated axle wheel set. Suitable current sensing means 20 is coupled to the DC bus 14 to provide a current feedback signal IL that is representative of the magnitude of current supplied by the power rectifier 13.

The main alternator 12 of the power rectifier 13 serves as a controllable source of electric power for the traction motors. The magnitude of output voltage or current of the source is determined and varied by the amount of excitation current supplied to field windings 12F on the rotor of the main alternator. These field windings are connected for energization to the output of a suitable source 17 of regulated excitation current IF. In the illustrative embodiment of the invention, the connection between the field windings 12F and the excitation current source 17 include a contact 12C of a conventional electromechanical field switch. The field switch has control means 12D for moving it to a first or normal state in which the contact 12C is closed and freely conducts excitation current and for causing the switch to change between its first state and its second or alternative state in which the contact 12C is open and excitation current is effectively interrupted.

The excitation current source 17 may comprise a three-phase controlled rectifier bridge having input terminals 18 which receive alternating voltage from a prime mover driven auxiliary alternator that can actually comprise an auxiliary set of three-phase armature windings on the same frame as the main alternator 12. This source 17 is labeled field regulator in FIG. 1. It includes conventional means for varying the magnitude of direct current IF supplied to the alternator field 12F (and hence the output of the alternator 12) as necessary to minimize any difference between the value of a variable control signal VC on an input line 19 and a feedback signal which during motoring is representative of the average magnitude V of the rectified output voltage of the main alternator 12. The voltage V is sensed by a conventional voltage sensing module (not shown) connected across the DC output terminals of the power rectifier.

The current detecting or current monitoring means 20 is connected to monitor the current on the bus 14 supplied to the inverters 15. The monitor 20 provides a feedback signal representative of the magnitude of current supplied by the power rectifier 13 to the motors 16.

The prime mover 11 that drives the alternator field 12F is a thermal or internal combustion engine or equivalent. On a diesel electric locomotive, the motive power is typically provided by a high horsepower, turbo-charged, sixteen-cylinder diesel engine. Such an engine has a fuel system 24 that includes a pair of fuel pump racks for controlling how much fuel oil flows into each cylinder each time an associated fuel injector is actuated by a corresponding fuel cam on engine cam shafts. The position of each fuel rack, and hence the quantity of fuel supplied to the engine, is controlled by an output piston of an engine speed governor system 25 to which both racks are linked. The governor regulates engine speed by automatically displacing the racks, within predetermined limits, in a direction and by an amount that minimizes any difference between actual and desired speeds of the engine crankshaft. The desired speed is set by a variable speed call signal received from an associated controller 26, which signal is herein called speed command signal or the speed call signal. An engine speed signal (RPM) indicates the actual rotational speed of the engine crankshaft and hence the alternator field. The speed command signal for the engine governor system 25 and the excitation control signal VC for the alternator field current source 17 are provided by the controller 26. In a normal motoring or propulsion mode of operation, the values of these signals are determined by the position of a handle of a manually operated throttle 27 to which the controller 26 is electrically coupled. A locomotive throttle conventionally has eight power positions or notches (N8 plus idle and shutdown. N1 corresponds to a minimum desired engine speed (power), while N8 corresponds to maximum speed and full power. With the throttle in its idle position, the controller 26 is operative to impose on the control signal VC a value corresponding to IF=0, and no traction power is produced by the main alternator 12. When the electrical braking of a moving locomotive is desired, the operator moves the throttle handle to its idle position and manipulates an interlocking handle of a companion brake control device 28 so that the main controller 26 is now supplied with a variable "brake call" signal. The controller sets up the alternator for minimum voltage. The AC motor will then build up flux and act as a generator. The amount of braking torque is then controlled by controlling the slip frequency of the AC motor by control of conduction of the inverted switching devices. In a consist of two or more locomotives, only the lead unit is usually attended, and the controller on board each trail unit will receive, over train lines, end coded signals that indicate the throttle position or brake call selected by the operator in the lead unit.

For each power level of the engine there is a corresponding desired load. The controller 26 is suitably arranged to translate the notch information from the throttle 27 into a reference signal value which establishes a voltage output from the alternator required by the motors in order to generate the torque or power being called for by the notch position. For this purpose, and for the purpose of deration (i.e., unloading the engine) and/or limiting engine speed in the event of certain abnormal conditions, it is necessary to supply the controller 26 with information about various operating conditions and parameters of the propulsion system, including the engine.

As illustrated in FIG. 1, the controller 26 receives the above-mentioned engine speed signal RPM, voltage feedback signal V, and current feedback signal IL which is representative of the magnitude of current supplied to the motors 16. The controller also receives a load controlled signal issued by the governor system 25 if the engine cannot develop the power demanded and still maintain the called for speed. The load control signal is effective, when issued, to reduce the power reference value in the controllers 26 so as to weaken the alternator field until a new balance point is reached. Additional data supplied to the controller 26 includes "volt max" and "cur max" data that establish absolute maximum limits for the alternator output voltage and current respectively. The controller also receives "crank" data indicating whether or not an engine starting or cranking routine is being executed and relevant inputs from other selected sources, as represented by the block labeled "Other". The alternator excitation source 17 and the controller communicate with each other via a multi-line serial dam link or bus 21. The controller 26 also communicates with the control means 12D that is operative, when energized in response to a "close" command from the controller, to move the field switch contact 12C to its closed position.

In the preferred embodiment of the invention, the controller 26 comprises a microcomputer. A person skilled in the art will understand that a microcomputer is actually a coordinated system of commercially available components and associated electrical circuits and elements that can be programmed to perform a variety of desired functions. In a typical microcomputer, a central processing unit (CPU) executes an operating program stored in an erasable and electrical reprogrammable read only memory (EPROM) which also stores tables and data utilized in the program. Contained within the CPU are conventional counters, registers, accumulators, flip-flops (flags), etc. along with a precision oscillator which provides a high frequency clock signal. The microcomputer also includes a random access memory (RAM) into which data may be temporarily stored and from which data may be read at various address locations determined by the program stored in the EPROM. These components are interconnected by appropriate address, data and control buses, one of such buses being indicated at 29 and shown connecting signals from the controller 26 to the inverters 15, the control switch 12D and a display 30. The microprocessor used in the controller 26 may be a conventional processor of the type available from Intel Corporation or of the alternative type available from Motorola, Inc.

The controller 26 is programmed to produce, in the motoring mode of operation, a control signal value on the line 19 that varies as necessary to zero any error between the value of the alternator voltage feedback signal V and a reference value that normally depends on the throttle position selected by the locomotive operator and the traction power output of the main alternator. One method for implementing this control function is disclosed in U.S. Pat. No. 4,634,887. In order to implement an electrical braking mode of operation, the controller 26 is programmed to vary the conduction of the switching devices in the inverters in a manner to vary or control the slip frequency of the AC motors. The controller 26 also provides the signals necessary to control the timing of the firing of the rectifier devices within the inverters 15 in such a manner as to establish a desired frequency of operation of the power supplied by the inverters 15 to the motors 16 so as to control the speed of the locomotive. Suitable feedback means are also provided from the wheel axle sets of the locomotive by means 31 which may be conventional tachometers providing signals SPD to the controller 26. Conventionally, each wheel axle set may be associated with a separate tachometer or speed sensor to provide multiple signals indicative of speed to the controller so as to be able to detect wheel slip or slide conditions.

While the above description of the controller 26 implies that the controller is strictly a voltage or current regulator, it will be appreciated that the conventional controller while regulating voltage and current output of the alternator 12 typically utilizes calculations of the actual power delivered to the motors 16 and by the actual horsepower or torque developed by the motors 16. Power and torque are quantifies that are calculated within the controller 26 from the values of voltage and current supplied to the motors. Furthermore, each motor may also be supplied with flux sensing windings to enable a direct measurement of horsepower being developed within the motors by measurement of motor flux; or, in a preferred form, the terminal voltage and motor current are measured and used to estimate the horsepower developed by the motors. Torque or tractive effort can be estimated from the integral of voltage multiplied by current.

In a DC electric propulsion system, each of the motors 16 would be separately controlled and would include their own individual current sensors for monitoring power supplied to these motors. In an AC electric propulsion system, only a single current monitor 20 is used to measure current output of the power rectifier 13. Since the measurement of power is critical to the calculations of horsepower and torque being developed by the motors 16, a failure of the current monitor or sensor 20 would be critical to operation of the locomotive. In particular, it has been prior practice to disable the locomotive if the current sensor malfunctions by providing some reading which is outside of normal acceptable values. The present invention provides a means for allowing the locomotive to be maintained online and operating despite the failure of the current sensor 20.

Figure 3:
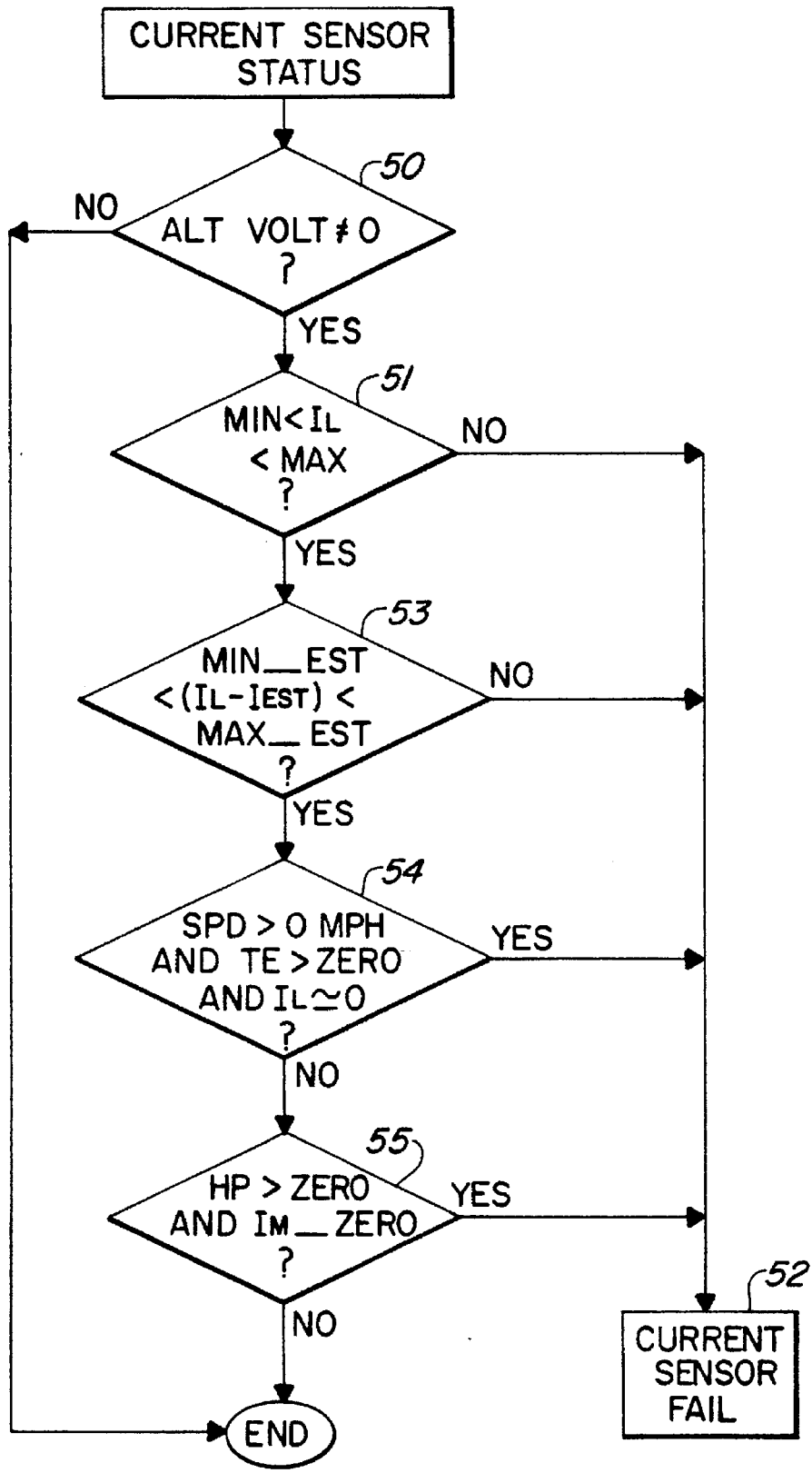
FIG. 3 is a flow chart showing one implementation of a program for detection of a current sensor failure.

Referring briefly to FIG. 3, there is shown a flow chart for a program implemented within the controller 26 (FIG. 1) which constantly monitors operation of the current sensor 20 and determines whether the current sensor has a malfunction. For the purpose of the illustrative program, it will be assumed that the locomotive is powered by six axles, each of which is connected to be driven by an AC traction motor having a nominal reading of 750 horsepower per motor. The program initially checks to make sure that the system is operating and that there is a voltage being produced by the power rectifier 13. If the rectifier is operating, (alt_volt≠0, block 50) the system compares (block 51) the value of IL (current reading from sensor 20) to a minimum value selected to be less than a normal value for motoring, for example, a negative value current such as minus 10 amps, and to a maximum value of current selected to be substantially greater than the normal operating current, for example, several thousand amps, for a selected time period sufficient to preclude transient tripping. If the magnitude of current indicated by the current monitor is less than the selected minimum or greater than the selected maximum for longer than the selected time period, it is assumed that the current monitor is inoperative since these values are outside the normal operating conditions of a locomotive in a motoring mode and the program steps to block 52 indicating a current sensor failure. A further check of the current sensor is made at block 53 by comparing the value of current read by the sensor to an estimated value of current obtained from the commanded status of the motors. More particularly, the controller 26 utilizes internal data based upon its commanded power output to determine what the value of current should be and then compares that value against the actual current being read by the current sensor. If the high value of motor current from sensor 20 deviates from the estimated value by a substantial amount, for example several hundred amperes for a time period sufficient to preclude tripping on transient readings, it is again determined that the sensor is malfunctioning.

A still further check of current sensor operability is made in block 54 by checking to assure that the locomotive is in motion and that the tractive effort being generated by the locomotive is greater than zero, thus indicating that the locomotive is operating. If tractive effort is sufficient to indicate locomotive operation and if the current sensor 20 indicates substantially a value of zero current, it is again assumed that the sensor is inoperative.

Still another check, as indicated in block 55, involves determining whether the air gap horsepower developed by the motors 26 is greater than a selected non-zero value, thus indicating locomotive operation, and whether the value of current indicated by the sensor is substantially zero for a selected time interval sufficient to preclude transient tripping. In such event, it is again assumed that the current sensor has malfunctioned.

All of the above checks are intended to assure that the current sensor is operative. As will be apparent, control of the power supplied to the motors 16 is critical for proper operation of the locomotive. However, in the case of a malfunction it is more desirable to assure that the malfunction is attributable to the current sensor and not to some other aspect of the propulsion system. If the malfunction is attributable to the current sensor, the locomotive can be operated in a derated condition where it can still contribute to assisting other locomotives in a consist in pulling a train. Without operating the locomotive, it becomes a dead weight and significantly affects performance of the train.

Figure 2:
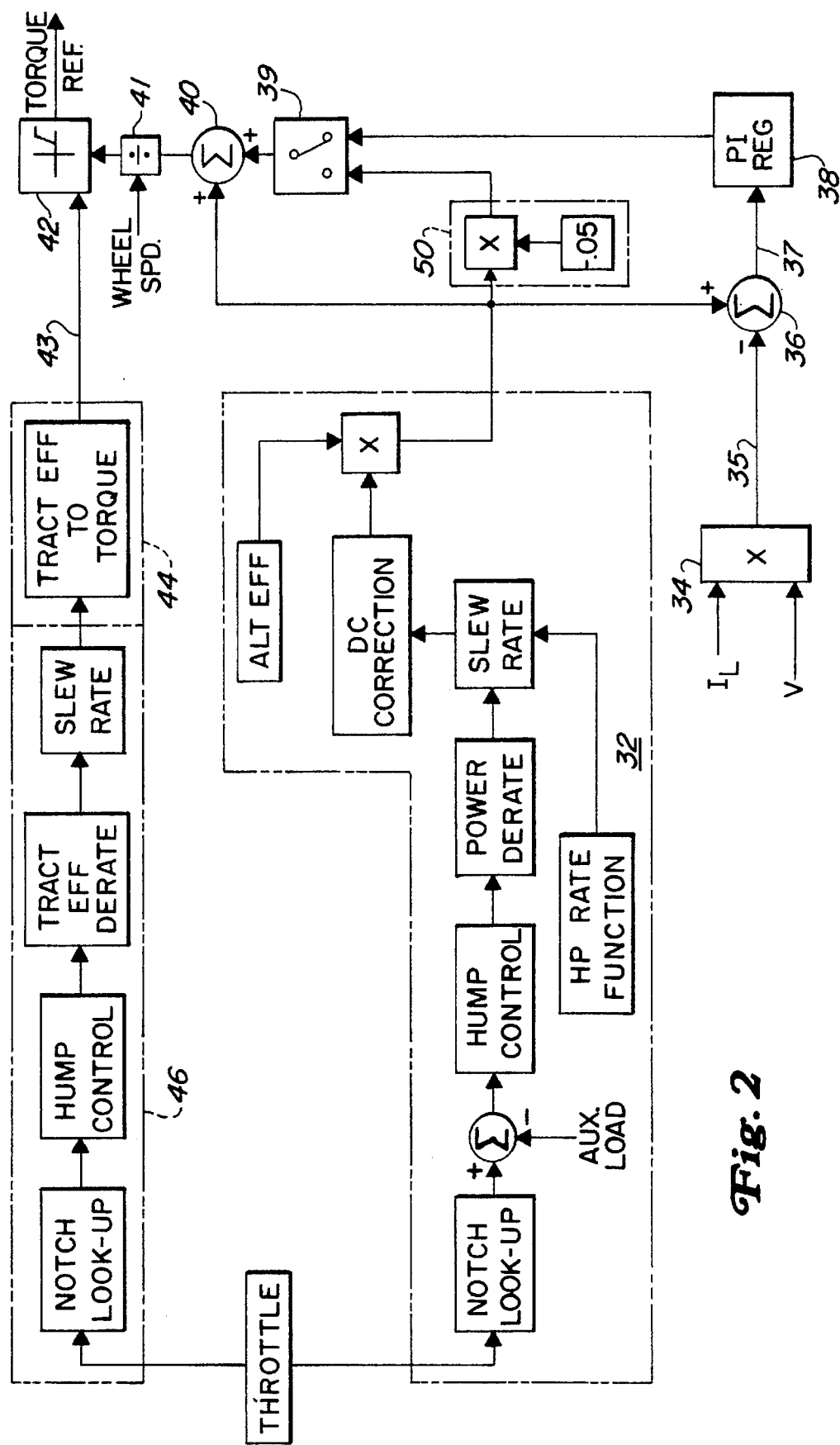
FIG. 2 is a simplified functional block diagram of a power control system in accordance with the present invention and implemented within the controller of FIG. 1.

Turning now to FIG. 2, there is shown a simplified functional block diagram of a portion of the control algorithm implemented within the microcomputer of controller 26. As discussed briefly above, the input command from the locomotive operator is a throttle position or motor power reference command indicated by a particular notch position of the throttle controlled by the operator. The throttle position is supplied to the controller 26 and a selected output voltage from the alternator 12 is generated for each notch position. The command or notch position is interpreted by the controller 26 and is modified by the amount of auxiliary load on the locomotive such as from other train cars, heaters and auxiliary items. This is typically a deration function that is necessary since the diesel engine 11 may be called upon to generate a maximum horsepower, but the additional loads on the engine may not allow that amount of horsepower to be supplied to the driving wheels of the vehicles through the AC traction motors 16. Once the horsepower command has been adjusted by subtracting out the auxiliary loading, the resultant command is supplied through various functions such as a hump control, power deration circuit, and a slew rate limit circuit. All of these functions are described in the aforementioned U.S. Pat. No. 4,634,887. The slew rate limit circuit controls the rate at which horsepower is allowed to change within the system. The signal developed after modification by the slew rate limit circuit may be further modified to correct for alternator efficiency, i.e., the fact that the alternator may be only 95% efficient. The resulting signal becomes the net power reference signal.

In FIG. 2, all of the above functions are implemented within the power control block 32 so that the output of the functional power control block 32 is the net power command signal for the locomotive in a motoring mode. The actual feedback signals VL and IL are applied to a multiplier circuit 34 which converts these signals to an equivalent power signal on the line 35. The equivalent power signal is subtracted from the net power signal from power control 32 in a summing junction 36 to produce an error signal on line 37. The error signal represents the difference between the actual power developed at the output of the rectifier circuit 13 (FIG. 1) and the amount of power commanded by the particular notch position or throttle position set by the operator. This error signal is applied to a conventional proportional plus integral regulator 38 and a resultant integrated term is then supplied to a first input terminal of an electronic switch 39. The switch 39 appears as an electronic multiplexer but may in fact simply be a software implementation of such a multiplexer. In the normal mode of operation, i.e., when the current sensor 20 is assumed to be functioning normally, the signal from the PI regulator 38 is coupled through the switch 39 and applied to a second summing junction 40. In summing junction 40, the error signal is added to the net power reference signal to provide a power output command signal for setting the power output of the alternator 12 and controlling the operation of the inverters 15. The power command signal is applied to a divider 41 or is divided by wheel speed to obtain a signal proportional to torque. The torque signal is then applied to a torque limit circuit 42 to output the torque reference command. The torque reference command is then used by the controller 26 to control inverters 15. The maximum allowable torque reference command is set by an input on line 43 from a torque converter 44 and tractive effort converter 46. These two functions operate conjointly to establish a tractive effort reference based on the locomotive operator's throttle notch position with tractive effort being converted to torque by dividing by wheel speed. Constraints, such as a conventional deration value and a slew rate limit, are placed on the torque reference and the resultant value is then applied to limit circuit 42 to establish a maximum limit on torque.

In the case of a malfunction of the current monitor 20, the controller 26 switches the switch 39 to the second position such that the signal from the PI regulator 38 is now open circuited and the switch 39 accepts a signal from a multiplier 50. The multiplier 50 is connected to receive the net power reference signal from power control 32 and to multiply it by a preselected value such as, for example,0.05. This selected value effectively derates the magnitude of the net power reference signal by five percent when it is summed with the power reference signal in summing junction 40. Accordingly, the power reference signal that is supplied to the torque converter circuit 41 is always five percent less than the actual net power reference signal from the power control 32. The torque converter circuit works in the normal manner to provide a torque reference signal for controlling the output power of the alternator 12 and power rectifier 13. However, it will be noted that the power control is now solely dependent on throttle position which has been derated by subtracting at least five percent from the net power reference signal.

Since locomotives are normally run in a consist of at least two and usually more in pulling long wains, some deration of the available power from one of the locomotives in the consist will not be detrimental to operation of the train. As previously noted, typically the throttle positions are linked from locomotive to locomotive by train line signals so that other locomotives within the consist will be producing the desired power output and perhaps only one of the locomotives will be operating at a reduced power level.

While the invention has been described in what is presently considered to be a preferred embodiment, it is anticipated that various modifications will become apparent to those skilled in the art. It is intended therefore that the invention not be limited to this specific disclosed embodiment but be interpreted within the full spirit and scope of the appended claims.

What is claimed is:

1. A control system for a diesel electric locomotive of the type in which a diesel engine is connected in driving relationship to an electric power generator, power output terminals of the generator being connected to input terminals of an alternating current (AC) to direct current (DC) power converter and output terminals of the power converter being connected to relatively positive and relatively negative DC buses, a plurality of DC to AC inverters being connected in parallel to the DC buses, a plurality of DC to AC inverters being connected in parallel to the DC buses with each of the inverters being connected for supplying controlled AC power to at least one AC electric traction motor coupled in driving relationship to wheels of the locomotive, the control system being connected for controlling the power output of the inverters in response to an operator's command and to sensed operating conditions of the locomotive and wherein one of the sensed operating conditions is power output of the converter determined by measuring the voltage between the DC buses and the current output of the converter using a series connected current monitor, the improvement comprising:

means for sensing failure of the current monitor; and means responsive to a sensed failure for modifying the control system to substitute a selected value for the sensed power output of the converter, the sensed power output being combined in a feedback control loop with a signal representative of the commanded power output to produce a power error signal, the failure responsive means including switch means for interrupting the power error signal and substituting for the power error signal a signal proportional to the commanded power output signal.

2. The control system of claim 1 wherein the feedback control loop comprises a first summing junction for summing the commanded power output signal with the sensed power output to generate the power error signal, a proportional plus integral (PI) circuit for conditioning the error signal and a second summing junction for summing the conditioned error signal with the commanded power output signal and wherein the failure responsive means includes switch means connected between the PI circuit and the second summing junction and having a first input terminal connected for receiving the conditioned error signal and a second input terminal connected for receiving the signal proportional to the commanded power output signal and an output terminal connected to an input terminal of the second summing junction, the switch means being responsive to the failure responsive means for selectively coupling said first and second input terminals thereof to said output terminal for application to said second summing junction.

* * * * *